(Model.)

A. D. HENDRICK.
FISHING REEL.

No. 485,794. Patented Nov. 8, 1892.

WITNESSES
M. Newman,
F. J. Tanner

INVENTOR
Augustus D. Hendrick
by his attorney
J. H. Hubbard

THE NORRIS PETERS CO., PHOTO-LITHO., WASHINGTON, D. C.

UNITED STATES PATENT OFFICE.

AUGUSTUS D. HENDRICK, OF BIRMINGHAM, CONNECTICUT, ASSIGNOR TO ISAAC J. BOOTH, OF SAME PLACE.

FISHING-REEL.

SPECIFICATION forming part of Letters Patent No. 485,794, dated November 8, 1892.

Application filed March 2, 1892. Serial No. 423,524. (Model.)

*To all whom it may concern:*

Be it known that I, AUGUSTUS D. HENDRICK, a citizen of the United States, residing at Birmingham, in the county of New Haven and State of Connecticut, have invented certain new and useful Improvements in Fishing-Reels; and I do hereby declare the following to be a full, clear, and exact description of the invention, such as will enable others skilled in the art to which it appertains to make and use the same.

This invention relates to certain novel and useful improvements in fishing-reels, and has for its object to provide a device of this description which shall be cheap and simple in its construction, in which all the parts are readily accessible, and in which the line shall wind freely onto the spool, as in more expensive reels; and with these ends in view my invention consists in the construction and combination of elements hereinafter fully explained, and then recited in the claims.

In order that those skilled in the art to which my invention appertains may clearly understand its construction and method of operation, I will describe the same in detail, reference being had to the accompanying drawings, which form a part of this specification, and in which—

Figure 1:
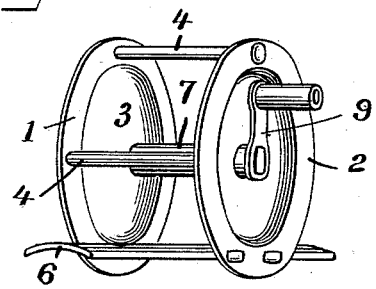
Figure 4:
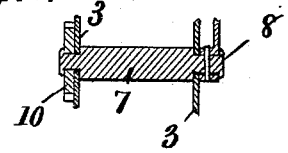
Figure 2:
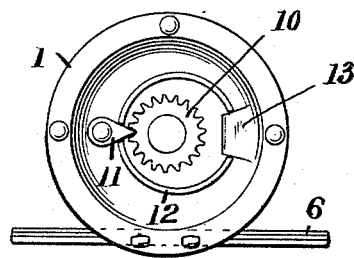
Figure 3:
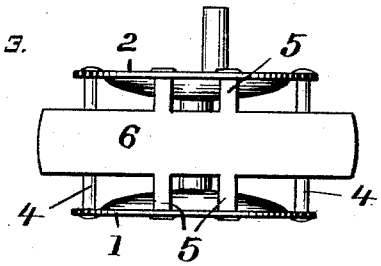

Figure 1 is a perspective; Fig. 2, an end elevation from the left of Fig. 1; Fig. 3, a bottom plan view, and Fig. 4 a section through the spool.

The same numerals denote the same parts in each of the figures.

The side plates of the reel I designate by 1 and 2. Each of these at its center is of concavo-convex form, so as to form cheeks 3, as appears in Figs. 1 and 3. In expensive reels it has heretofore been customary to make these cheeks, either by attachment or integral formation, a part of the rotating spool. Their purpose is as the line winds to prevent it from piling at the ends of the spool, and for this reason flat side plates are objectionable. The plates 1 and 2 are connected in part by means of bars 4, whose heads are expanded or upset on the outside of the plates. At the bottom, however, said plates are connected by lateral projections 5, which are formed integral with the reel-plate 6, and, these being upset or headed on the outside of the side plates, not only attach the reel-plate firmly in position, but also supplement the other fastenings. The spool or spindle 7 is shouldered on one end, as at 8, and has a bearing and is adapted to revolve in the two plates 1 and 2. Upon the shoulder 8, just outside the plate 2, is firmly secured, as by a pin or screw, a crank 9, bearing handle 14. Said crank, as is clearly shown at Fig. 1, lies within the concavity formed in the outside of the plate by the projecting cheek on the inside. This tends greatly to avoid fouling of the line by catching under the crank. The other end of the spool 7 is also shouldered and has a journal-bearing in the plate 1, and upon its outer end it bears a click-wheel 10. The teeth of this wheel are engaged by the point of a swinging pawl 11, and this pawl when the reel is operated moves in either direction against the power of a spring 12, which lies within the external recess of plate 1 and is secured in position in a base 13. As will be observed, the ratchet-wheel, the pawl, and the spring, although upon the outside of the reel and uncovered, lie inside the plane of the outer face of the plate, and so are not likely to catch upon the clothing or to become entangled with the slack line nor to receive any injury.

The foregoing construction forms a reel of very great simplicity and cheapness; but at the same time by the formation of the guide-cheeks integral with the side plates the piling of the line is prevented and these cheeks produce the external recesses, in one of which lies the handle and in the other of which is contained the click.

I claim—

1. In a fishing-reel, a pair of side plates concavo-convex in cross-section, whereby are formed interior cheeks and exterior recesses, in combination with a winding-spool journaled between said cheeks and a suitable crank and click, substantially as specified.

2. The combination, with the side plates having the opposed and inwardly-projecting cheeks, of the spool journaled in the plates, a click-wheel mounted upon one end of the spool outside the plate, but within the concavity, and a pawl co-operating with said click-wheel, substantially as described.

3. A reel comprising the side plates 1 and 2, in combination with a reel-plate 6, having projections 5 formed integral therewith and riveted through the side plates, substantially as described.

In testimony whereof I affix my signature in presence of two witnesses.

AUGUSTUS D. HENDRICK.

Witnesses:
FRANCIS H. MACKAY,
ISAAC J. BOOTH.